US012776432B2

(12) United States Patent
Kishimoto et al.

(10) Patent No.: US 12,776,432 B2
(45) Date of Patent: Oct. 27, 2026

(54) SEMI-HARD MAGNETIC POWDER HAVING A HIGH VALUE AND METHOD FOR SYNTHESIZING SAME

(71) Applicant: NITTETSU MINING CO., LTD., Tokyo (JP)

(72) Inventors: Akira Kishimoto, Tokyo (JP); Takahiro Ito, Tokyo (JP); Naoto Kitamura, Tokyo (JP)

(73) Assignee: NITTETSU MINING CO., LTD., Tokyo (JP)

(*) Notice: Subject to any disclaimer, the term of this patent is extended or adjusted under 35 U.S.C. 154(b) by 563 days.

(21) Appl. No.: 18/236,519

(22) Filed: Aug. 22, 2023

(65) Prior Publication Data

US 2023/0395290 A1 Dec. 7, 2023

Related U.S. Application Data

(63) Continuation-in-part of application No. PCT/JP2022/007404, filed on Feb. 22, 2022.

(30) Foreign Application Priority Data

Feb. 24, 2021 (JP) ................................ 2021-026958

(51) Int. Cl.

| | |
|---|---|
| ***H01F 1/03*** | (2006.01) |
| ***B22F 1/05*** | (2022.01) |
| ***B22F 1/142*** | (2022.01) |
| ***B22F 1/16*** | (2022.01) |
| ***B22F 1/17*** | (2022.01) |
| ***C09C 3/06*** | (2006.01) |
| ***C21D 6/00*** | (2006.01) |
| ***C21D 9/00*** | (2006.01) |
| ***C22C 38/06*** | (2006.01) |
| ***C22C 38/10*** | (2006.01) |
| ***C22C 38/14*** | (2006.01) |
| ***C22C 38/16*** | (2006.01) |
| ***C23C 28/00*** | (2006.01) |

(52) U.S. Cl.

CPC .............. *H01F 1/0306* (2013.01); *B22F 1/05* (2022.01); *B22F 1/142* (2022.01); *B22F 1/16* (2022.01); *B22F 1/17* (2022.01); *C09C 3/066* (2013.01); *C21D 6/001* (2013.01); *C21D 6/007* (2013.01); *C21D 9/00* (2013.01); *C22C 38/06* (2013.01); *C22C 38/105* (2013.01); *C22C 38/14* (2013.01); *C22C 38/16* (2013.01); *C23C 28/32* (2013.01); *C23C 28/3455* (2013.01); *B22F 2201/10* (2013.01); *B22F 2301/255* (2013.01); *B22F 2301/35* (2013.01); *B22F 2302/25* (2013.01); *B22F 2304/10* (2013.01); *B22F 2998/10* (2013.01); *B22F 2999/00* (2013.01); *C01P 2004/61* (2013.01); *C01P 2004/80* (2013.01); *C01P 2006/12* (2013.01); *C01P 2006/42* (2013.01); *C01P 2006/62* (2013.01)

(58) Field of Classification Search

CPC ....... H01F 1/0306; C21D 6/001; C21D 6/007; C21D 9/00; C09D 5/23; C09C 3/066; C22C 38/06; C22C 38/105; C22C 38/14; C22C 38/16; C23C 28/32; C23C 28/3455; C01P 2004/61; C01P 2004/80; C01P 2006/12; C01P 2006/42; C01P 2006/62; B22F 1/16; B22F 1/05; B22F 1/0306; B22F 1/142; B22F 1/17; B22F 2201/10; B22F 2301/255; B22F 2301/35; B22F 2301/15; B22F 2301/052; B22F 2302/25; B22F 2304/10; B22F 2998/10; B22F 2999/00

See application file for complete search history.

(56) References Cited

U.S. PATENT DOCUMENTS

| | | | | |
|---|---|---|---|---|
| 8,034,404 | B2 | 10/2011 | Kishimoto et al. | |
| 9,617,435 | B2 | 4/2017 | Krueger et al. | |
| 11,694,827 | B2 | 7/2023 | Kim et al. | |
| 2007/0184268 | A1* | 8/2007 | Kishimoto | C09C 3/063 427/212 |
| 2012/0091701 | A1 | 4/2012 | Krueger et al. | |
| 2015/0235745 | A1† | 8/2015 | Choe | |
| 2020/0357544 | A1† | 11/2020 | Kim | |
| 2020/0391285 | A1* | 12/2020 | Choe | C22C 30/02 |
| 2022/0153055 | A1† | 5/2022 | Kim | |
| 2022/0172867 | A1† | 6/2022 | Kim | |

FOREIGN PATENT DOCUMENTS

| | | | |
|---|---|---|---|
| JP | 10-280011 | A | 10/1998 |
| JP | 4113045 | B2 | 7/2008 |
| JP | 2012-523470 | A | 10/2012 |

(Continued)

OTHER PUBLICATIONS

International Search Report issued in International Patent Application No. PCT/JP2022/007404, dated Apr. 12, 2022, along with an English translation thereof.

(Continued)

*Primary Examiner* — C Melissa Koslow

(74) *Attorney, Agent, or Firm* — Greenblum & Bernstein, P.L.C.

(57) ABSTRACT

An object of the present invention is to provide a semi-hard magnetic white powder having characteristics suitable as a security pigment, such as the magnetic powder contained in magnetic inks used for MICR. The white powder includes base particles made of a semi-hard magnetic Alnico alloy, the base particles having a titanium oxide film and a metallic silver film in this order on the surfaces thereof.

12 Claims, 1 Drawing Sheet

(56) References Cited

FOREIGN PATENT DOCUMENTS

| | | | |
|---|---|---|---|
| JP | 2017-211446 | A | 11/2017 |
| JP | 2021-503553 | A | 2/2021 |
| KR | 10-2020-44549 | A | 4/2020 |
| KR | 10-2020-44558 | A | 4/2020 |
| WO | 2019/132232 | A1 | 7/2019 |
| WO | 2021/020634 | A1 | 2/2021 |

OTHER PUBLICATIONS

International Preliminary Report on Patentability issued in International Patent Application No. PCT/JP2022/007404, dated Aug. 24, 2023, along with an English translation thereof.
Office Action that issued in corresponding Japanese Patent Appl. No. 2021-026958, mailed Jun. 10, 2025, along with English translation thereof.
Third Party Submission that was filed on Sep. 9, 2025, in corresponding German Patent Application No. DE 11 2022 001 223.4, along with English translation thereof.
Office Action that issued in corresponding Japanese Patent Appl. No. 2021-026958, mailed Dec. 17, 2024, along with English translation thereof.
Office Action that issued in the corresponding GB Patent Application No. GB2314026.2 dated Jan. 23, 2024.

* cited by examiner
† cited by third party

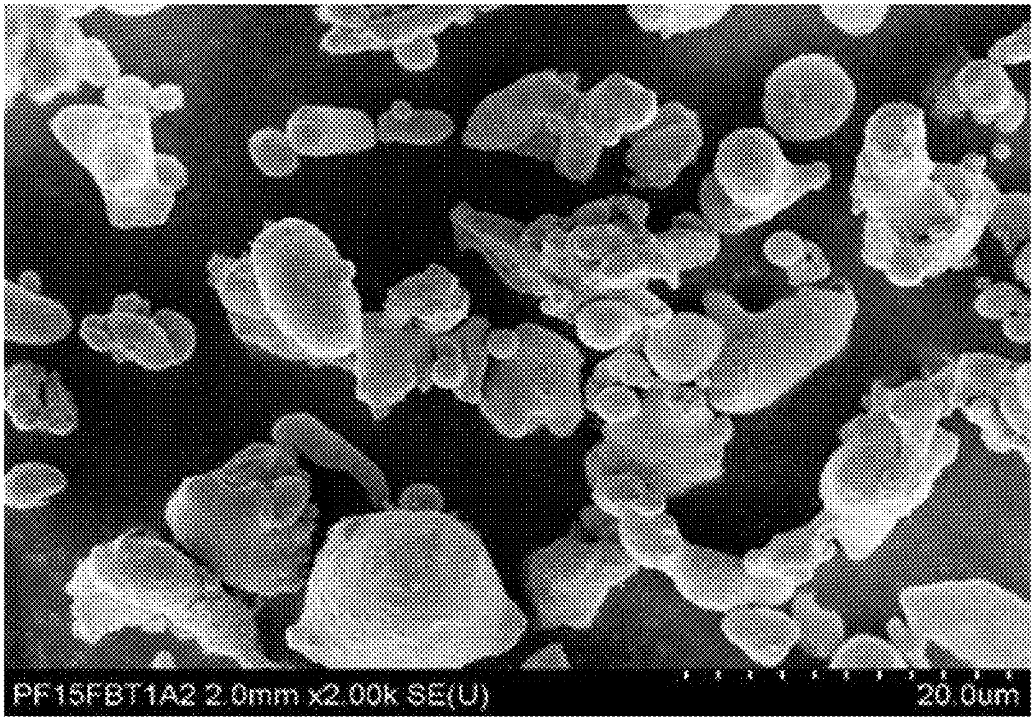
PF15FBT1A2 2.0mm x2.00k SE(U)
20.0um

SEMI-HARD MAGNETIC POWDER HAVING A HIGH VALUE AND METHOD FOR SYNTHESIZING SAME

CLAIM FOR PRIORITY

This application is a Continuation-In-Part of PCT/JP2022/007404 filed Feb. 22, 2022, and claims the priority benefit of Japanese application 2021-026958 filed Feb. 24, 2021, the contents of which are expressly incorporated by reference herein in their entireties.

TECHNICAL FIELD

The present invention relates to semi-hard magnetic powder such as Alnico alloy (Fe—Al—Ni—Co) powder, which is white powder featuring high lightness (whiteness). In particular, the present invention relates to a white powder that can be used as a security pigment, such as a magnetic powder contained in magnetic ink used for, for example, magnetic ink character recognition, abbreviated to MICR.

BACKGROUND ART

Magnetic ink character recognition (MICR) is a system intended to prevent the alternation or counterfeiting of securities and other predetermined media distributed in the market, using an identification mark printed on the media with magnetic ink. In this system, a dedicated reader reads the information in the identification mark, such as the shape or magnetic information, and whether the medium is true or false is determined based on the read information.

The magnetic ink used for MICR contains a magnetic powder and is required to have the characteristic of enabling the formation of highly durable and readable identification marks. The present invention relates to a white powder particularly suitable as the magnetic powder used in such security magnetic ink.

The characteristics generally required of magnetic powder used in magnetic ink include dispersibility sufficient to disperse in ink and the ability to sufficiently magnetize the ink.

When the magnetic powder in a magnetic ink for MICR is highly dispersible in the ink, the magnetic ink exhibits good fixability; when the magnetic powder has a high remnant magnetization or remanence (Mr), the magnetic ink exhibits good sensitivity and will contribute to increasing the image quality of the printed identification mark. Patent Literature 1 describes a magnetic ink using a magnetic powder consisting of a needle-shaped magnetic particle powder and a non-needle-shaped magnetic particle powder, wherein the magnetic properties are controlled by the shape anisotropy (needle shape) of the magnetic particles.

Alnico-based alloy is a type of alloy containing mainly Al, Ni, and Co or Al and Ni and the balance consisting of substantially Fe. Although Alnico-based alloy objects are generally produced by casting, they are very difficult to cut because of their hardness and brittleness. Accordingly, magnets or the like with small and complex shapes are produced by powder metallurgy or powder compaction.

In alloy powder production, atomization in which molten alloy is subjected to water atomization or gas atomization is widely used in practice. Unfortunately, the atomization of Alnico alloy is prone to clog the molten metal casting nozzle used for atomization because of high Al or Ti content, resulting in a low yield and increased costs and thus having problems of, for example, limiting mass production. Patent Literature 2 discloses a technique for producing Alnico alloy powder by atomization in which the clogging of the casting nozzle is prevented by adding Si to the molten metal.

Also, in general, many magnetic powders are black. Even though such a powder is provided with a color layer on the surface, the color of the powder is dark as a whole, and vividly colored magnetic color ink is not obtained. Patent Literature 3 describes a technique for obtaining a white powder with a high lightness by forming a titanium oxide film and a metallic silver film in this order on the surfaces of the base particles made of mainly a soft magnetic powder.

RELATED ART

Patent Literature

Patent Literature 1: Japanese Patent Laid-Open No. 2017-211446

Patent Literature 2: Japanese Patent Laid-Open No. H10-280011

Patent Literature 3: Japanese Patent No. 4113045

SUMMARY OF INVENTION

Problem to be Solved by the Invention

An object of the present invention is to provide a semi-hard magnetic white powder having characteristics suitable as a security pigment, such as the magnetic powder contained in magnetic inks used for MICR. In other words, the subject of the present invention is to provide a magnetic powder with semi-hard magnetism as a magnetic property and subjected to whitening treatment to increase the lightness.

Solution to Problem

To solve the above-described issues, the present invention includes the following:

[1] A white powder comprising base particles made of a semi-hard magnetic Alnico alloy, and a titanium oxide film and a metallic silver film that are disposed in this order on surfaces of the base particles made of the Alnico alloy outwardly from the surfaces.

[2] The white powder according to [1], wherein the base particles made of the Alnico alloy have a composition, relative to the total weight of the base particle made of the Alnico alloy, of:

7% to 13% by weight of Al, 14% to 25% by weight of Ni, 0% to 38% by weight of Co, 0% to 4% by weight of Cu, 0% to 8% by weight of Ti, and the balance consisting of Fe and inevitable impurities.

[3] The white powder according to [1] or [2], wherein the base particles made of the Alnico alloy are particles of an atomized powder formed by atomization.

[4] The white powder according to any one of [1] to [3], wherein the white powder has a semi-hard magnetism with a Mr of 15 emu/g or more.

[5] The white powder according to [4], wherein the white powder further has a semi-hard magnetism with a coercivity of less than 500 Oe in addition to the Mr of 15 emu/g or more.

[6] The white powder according to any one of [1] to [5], wherein the white powder has an average particle diameter of 5 μm to 20 μm, a specific surface area of 0.01 $m^2/g$ to 20 $m^2/g$, and a lightness L* of 75 or more.

[7] A magnetic ink including the white powder according to any one of [1] to [6].

[8] A method for producing a white powder made of an Alnico alloy, the method comprising forming a titanium oxide film and a metallic silver film in this order on surfaces of Alnico alloy powder particles outwardly from the surfaces.

[9] The method for producing a white powder according to [8], wherein the Alnico alloy powder has a composition, relative to the total weight of the Alnico alloy powder:

7% to 13% by weight of Al, 14% to 25% by weight of Ni, 0% to 38% by weight of Co, 0% to 4% by weight of Cu, 0% to 8% by weight of Ti, and the balance consisting of Fe and inevitable impurities.

[10] The method for producing a white powder according to [8] or [9], wherein the Alnico alloy powder is produced by atomization.

[11] The method for producing a white powder according to [10], wherein the Alnico alloy powder formed by the atomization has an average particle diameter of 1 μm to 100 μm and a specific surface area of 0.01 $m^2/g$ to 5.0 $m^2/g$.

[12] The method for producing a white powder according to any one of [8] to [11], wherein the Alnico alloy powder is subjected to heat treatment to be turned into a semi-hard magnetic powder with a Mr of 15 emu/g or more, followed by forming the titanium oxide film and the metallic silver film in this order.

[13] The method for producing a white powder according to [12], wherein the heat treatment is performed by heating for 0 to 30 minutes at 750° C. to 1000° C. in an inert gas atmosphere.

[14] The white powder according to any one of [1] to [6], wherein the white powder has a specific surface area of 0.01 $m^2/g$ to 5.0 $m^2/g$.

Advantageous Effects of Invention

The white powder of the present invention is semi-hard magnetic and therefore has magnetic properties suitable as the magnetic powder contained in magnetic inks used for MICR. Also, the white powder is subjected to whitening treatment to increase the lightness and, therefore, can produce a vividly colored magnetic color ink when further provided with a color layer thereon.

BRIEF DESCRIPTION OF DRAWING

FIG. 1 is an SEM photograph of an Alnico alloy powder coated with titanium oxide and silver.

DESCRIPTION OF EMBODIMENTS (Semi-Hard Magnetism)

The present invention is greatly characterized by using a semi-hard magnetic powder as a magnetic powder used for MICR or the like.

In general, ferromagnetic materials are classified into hard magnetic materials and soft magnetic materials depending on the magnetization characteristics. Whether a magnetic property of a magnetic material is hard magnetic or soft magnetic is generally determined depending on the magnitude of the coercivity. Hard magnetic materials have high coercivity and high Mr, and soft magnetic materials have low coercivity and low Mr.

In this regard, when a magnetic powder is used as a security pigment for MICR or the like, hard magnetic powder having high coercivity requires that large magnetization energy be applied from the outside and thus requires a large-scale magnetization apparatus. In contrast, soft magnetic powder having small coercivity reduces the magnetism of the medium after being magnetized to a level lower than the read limit of the magnetic information reader, resulting in a disadvantageous effect of failing to accurately read magnetic information.

Accordingly, the inventors of the present invention focused on semi-hard magnetic materials having intermediate magnetic properties between hard magnetism and soft magnetism as a magnetic powder.

Semi-hard magnetic materials have intermediate coercivity between hard and soft magnetic materials and can avoid the above-described disadvantageous effect. Additionally, since the coercivity and Mr of semi-hard magnetic materials are lower than those of hard magnetic materials, semi-hard magnetic materials are less likely to aggregate in magnetic ink, which is in a liquid form, and hence, the dispersibility and dispersion stability of their magnetic particles can be improved.

The Alnico alloy powder of the present invention has a low coercivity but an intermediate Mr between hard and soft magnetic materials and is, thus, a magnetic powder having characteristics suitable for use as a security pigment.

(Alnico Alloy Powder Produced by Atomization)

The Alnico alloy powder of the present invention is produced by atomization, so that it is possible to form the spherical powder particles with similar particle diameters to some extent.

Thus, the dispersibility in magnetic ink can be further improved. Additionally, the fluidity can be improved, and the printing characteristic with a printer is improved accordingly. Also, the spherical powder particles enable the formation of uniform thin $TiO_2$ and metallic silver films in the whitening step, which is a post-step in the present invention, thus favorable in view of magnetic properties.

(Particle Size of Alnico Alloy Powder)

The volume average particle diameter D50 of the Alnico alloy powder measured by a laser diffraction/scattering method is preferably 1 μm to 100 μm and more preferably 5 μm to 20 μm.

Also, the Alnico alloy powder preferably has a specific surface area of 0.01 $m^2/g$ to 5.0 $m^2/g$ in view of whitening the powder in a subsequent step. When the specific surface area is larger than 5.0 $m^2/g$, a large amount of metallic silver is required to hide the surfaces of the magnetic particles. Using a large amount of metallic silver is undesirable because it degrades the magnetization characteristics of the magnetic powder. When the specific surface area is smaller than 0.01 $m^2/g$, the particle size of the magnetic particles increases. This is unsuitable for printing security materials and thus undesirable.

To control the magnetic powder to a preferred specific surface area, it is preferable to classify the Alnico alloy powder after it is produced by atomization.

(Composition of Alnico Alloy Powder)

In general, it is believed that when the Ni content of Alnico alloy is reduced, the residual flux density increases and the coercivity decreases, while when the Al content is increased, the coercivity decreases. In the present invention, the Alnico alloy powder has an alloy composition in the following range. This enables the Alnico alloy to have a coercivity with a value suitable for use in magnetic inks.

The composition of the Alnico alloy powder used in the present invention, relative to the total weight of the Alnico alloy powder, is 7% to 13% by weight of Al, 14% to 25% by weight of Ni, 0% to 38% by weight of Co, 0% to 4% by weight of Cu, 0% to 8% by weight of Ti, and the balance consisting of Fe and inevitable impurities.

(Magnetization Treatment of Alnico Alloy Powder)

The thus formed Alnico alloy powder is magnetized to a desired magnetic material by aging heat treatment. The heat treatment is performed by heating for 0 to 30 minutes at 750° C. to 1000° C. in an inert gas atmosphere.

Such aging heat treatment can increase the Mr to a desired value.

Advantageous Effects of Invention (Whitening Method)

To whiten the Alnico alloy powder, a titanium oxide film and a metallic silver film are formed in this order on the surfaces of the powder particles.

The titanium oxide film is formed of mainly tetravalent titanium oxide $TiO_2$, but divalent or trivalent titanium oxide may be used. For forming the film, titanium alkoxide may be hydrolyzed, or an aqueous film may be formed from a titanium salt aqueous solution and then oxidized.

Next, in metallic silver film formation, a known method such as electroless plating may be used without particular limitation.

Such a whitening method can significantly increase the lightness of the magnetic powder because of the presence of the titanium oxide film between the magnetic powder and the silver film. Additionally, the metallic silver film can be formed to a smaller thickness than that of known metallic silver film-coated white powder, improving the magnetic properties of the white powder.

For the magnetic properties of the thus produced white powder, preferably, the Mr is 15 emu/g or more and the coercivity Hc is less than 500 Oe. For the shape, preferably, the average particle diameter (volume average D50) is 1 μm to 100 μm and the specific surface area is 0.01 $m^2$/g to 20 $m^2$/g. Also, the lightness L* is preferably 75 or more.

EXAMPLES (Alnico Alloy Powder)

Iron-aluminum-nickel-cobalt alloy of Epson Atmix Corporation produced by atomization (Al: 12.9 wt %, Ni: 20.9 wt %, Co: 4.9 wt %, Cu: 3.0 wt %, Mr: 2.1 emu/g, Hc: 0.02 Oe, lightness L*: 52) was classified by an air flow classifier, and a metal powder having the particle size distribution of $D_{10}$: 4.3 μm, $D_{50}$: 9.6 μm, and $D_{95}$: 24.7 μm was obtained. The specific surface area was 0.08 $m^2$/g.

(Magnetization Treatment)

The metal powder obtained by the classification was heat-treated at a temperature increase rate of 15° C./min in a nitrogen atmosphere. After the central temperature of the powder reached 850° C., the powder was air-cooled to yield a magnetic powder with Mr of 20.4 emu/g and Hc of 354 Oe.

(Whitening)

A transparent yellow peroxotitanic acid solution was prepared by mixing 2.2 mL of a titanium tetrachloride solution (16.0% to 17.0% in terms of Ti), 5.84 g of aqueous ammonia, and 10.0 g of hydrogen peroxide solution with 19.8 g of deionized water. In 535.81 g of deionized water, 9.92 g of boric anhydride, 11.72 g of potassium chloride, and 2.55 g of sodium hydroxide were dissolved. In this solution, 167.5 g of the above magnetic powder was suspended. The peroxotitanic acid solution was dropped into and mixed with the suspension with stirring, and then the suspended matter was dried to yield titanium oxide film-coated powder.

A reducing solution was prepared by dissolving 1.2 g of glucose, 0.12 g of tartaric acid, and 2.12 g of ethanol in 26.56 g of deionized water. A silver ammine complex solution was prepared by mixing 1.25 g of sodium hydroxide, 1.75 g of silver nitrate, and 3 g of aqueous ammonia with 90 g of deionized water, and 10.0 g of the titanium oxide film-coated powder was suspended in the complex solution. The reducing solution was mixed with the suspension being irradiated with ultrasonic waves, and the suspended matter was dried to yield silver film-coated powder.

(White Powder)

The resulting white powder had a lightness L* of 80.0, Mr of 21.6 emu/g, Hc of 362 Oe, $D_{50}$ of 13.5 μm, and a specific surface area of 0.1 $m^2$/g.

INDUSTRIAL APPLICABILITY

The white powder made of the Alnico alloy powder produced according to the present invention has semi-hard magnetic properties and significantly increased lightness, accordingly expected to be used as a highly useful security pigment in industry.

The invention claimed is:

1. A white powder comprising:

base particles made of a semi-hard magnetic Alnico alloy, wherein the base particles made of the Alnico alloy have a composition, relative to the total weight of the base particle made of the Alnico alloy, of:

7% to 13% by weight of Al;

14% to 25% by weight of Ni;

0% to 38% by weight of Co;

0% of Cu;

0% to 8% by weight of Ti; and the balance consisting of Fe and inevitable impurities; and a titanium oxide film and a metallic silver film that are disposed in this order on surfaces of the base particles made of the Alnico alloy outwardly from the surfaces.

2. The white powder according to claim 1, wherein the base particles made of the Alnico alloy are particles of atomized powder formed by atomization.

3. The white powder according to claim 1, wherein the white powder has semi-hard magnetism with a remnant magnetization or remanence (Mr) of 15 emu/g or more.

4. The white powder according to claim 3, wherein the white powder further has semi-hard magnetism with a coercivity of less than 500 Oe in addition to the Mr of 15 emu/g or more.

5. The white powder according to claim 1, wherein the white powder has an average particle diameter of 5 μm to 20 μm, a specific surface area of 0.01 $m^2$/g to 20 $m^2$/g, and a lightness L* of 75 or more.

6. The white powder according to claim 1, wherein the white powder has a specific surface area of 0.01 $m^2$/g to 5.0 $m^2$/g.

7. A magnetic ink comprising the white powder according to claim 1.

8. A method for producing a white powder made of an Alnico alloy, the method comprising:

forming a titanium oxide film and a metallic silver film in this order on surfaces of Alnico alloy powder particles outwardly from the surfaces, wherein the Alnico alloy powder particles have a composition, relative to the total weight of the Alnico alloy powder particles, of:

7% to 13% by weight of Al;

14% to 25% by weight of Ni;

0% to 38% by weight of Co;

0% of Cu;

0% to 8% by weight of Ti; and the balance consisting of Fe and inevitable impurities.

9. The method for producing a white powder according to claim 8, wherein the Alnico alloy powder is produced by atomization.

10. The method for producing a white powder according to claim 9, wherein the Alnico alloy powder formed by the atomization has an average particle diameter of 1 μm to 100 μm and a specific surface area of 0.01 $m^2/g$ to 5.0 $m^2/g$.

11. The method for producing a white powder according to claim 8, wherein the Alnico alloy powder is subjected to heat treatment to be turned into a semi-hard magnetic powder with a remnant magnetization or remanence (Mr) of 15 emu/g or more, followed by forming the titanium oxide film and the metallic silver film in this order.

12. The method for producing a white powder according to claim 11, wherein the heat treatment is performed by heating for 0 to 30 minutes at 750° C. to 1000° C. in an inert gas atmosphere.

* * * * *